(12) United States Patent
Skjelmose et al.

(10) Patent No.: US 12,264,651 B2
(45) Date of Patent: Apr. 1, 2025

(54) PRIORITIZATION OF POWER SET-POINTS FOR POWER GENERATING UNITS IN A POWER PLANT

(71) Applicant: VESTAS WIND SYSTEMS A/S, Aarhus (DK)

(72) Inventors: Mads Rajczyk Skjelmose, Risskov (DK); Steve Jessen, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 613 days.

(21) Appl. No.: 17/616,116

(22) PCT Filed: May 4, 2020

(86) PCT No.: PCT/DK2020/050128
§ 371 (c)(1),
(2) Date: Dec. 2, 2021

(87) PCT Pub. No.: WO2020/244718
PCT Pub. Date: Dec. 10, 2020

(65) Prior Publication Data
US 2022/0307471 A1 Sep. 29, 2022

(30) Foreign Application Priority Data
Jun. 3, 2019 (DK) .......................... PA 2019 70357

(51) Int. Cl.
*F03D 7/04* (2006.01)
*F03D 7/02* (2006.01)
(Continued)

(52) U.S. Cl.
CPC ........... *F03D 7/0284* (2013.01); *F03D 7/048* (2013.01); *G05B 19/042* (2013.01); *H02J 3/381* (2013.01);
(Continued)

(58) Field of Classification Search
CPC ..... F03D 7/0284; F03D 7/048; G05B 19/042; G05B 2219/2619; H02J 3/381; H02J 3/46;
(Continued)

(56) References Cited

U.S. PATENT DOCUMENTS 8,598,726 B1 * 12/2013 Yasugi ................... H02J 3/472
290/44
2014/0103652 A1 4/2014 Ubben et al.
(Continued)

FOREIGN PATENT DOCUMENTS

CN 105794068 A 7/2016
CN 109416020 A 3/2019
(Continued)

OTHER PUBLICATIONS

Chinese Patent Office, First Office Action for Chinese Patent Application No. 2020800352413, dated Nov. 24, 2023.
(Continued)

*Primary Examiner* — Charles Cai
(74) *Attorney, Agent, or Firm* — Patterson + Sheridan, LLP

(57) ABSTRACT

The invention relates to a method for controlling power generation from a power plant which comprises power generating units such as wind turbine generators. The power generating units are controllable to produce power dependent on individual power set-points. The method comprises steps of obtaining desired target power set-points for one or more prioritized power generating units, determining final target power set-points for the one or more prioritized power generating units based on the target power set-points and an available power adjustment margin of the power plant which is available for adjustment of the power set-points of the one or more prioritized power generating units, and dispatching the final target power set-points to the prioritized power generating units.

18 Claims, 4 Drawing Sheets

(51) Int. Cl.
  *G05B 19/042* (2006.01)
  *H02J 3/38* (2006.01)
  *H02J 3/46* (2006.01)
(52) U.S. Cl.
  CPC ........... *H02J 3/46* (2013.01); *F05B 2220/706* (2013.01); *F05B 2270/337* (2013.01); *G05B 2219/2619* (2013.01); *H02J 2300/28* (2020.01)
(58) Field of Classification Search
  CPC ............ H02J 2300/28; F05B 2220/706; F05B 2270/337; Y02E 10/72
  See application file for complete search history.

(56) References Cited

U.S. PATENT DOCUMENTS

| | | |
|---|---|---|
| 2014/0207296 A1 | 7/2014 | Kjaer et al. |
| 2015/0249415 A1 | 9/2015 | Babazadeh et al. |
| 2015/0275862 A1 | 10/2015 | Babazadeh et al. |
| 2021/0249949 A1* | 8/2021 | Leroy ..................... H02M 1/40 |

FOREIGN PATENT DOCUMENTS

| | | | |
|---|---|---|---|
| EP | 2028368 A2 | 2/2009 | |
| WO | 2015180727 A1 | 12/2015 | |
| WO | 2017118460 A1 | 7/2017 | |
| WO | WO-2018006920 A1 * | 1/2018 | ............. F03D 7/028 |
| WO | 2020244718 A1 | 12/2020 | |

OTHER PUBLICATIONS

Danish Patent and Trademark Office, 1st Technical Examination and Searh Report for Patent Application PA 2019 70357 Jan. 9, 2020, pp. 1-8.

PCT, Notification of Transmittal of The International Search Report and The Written Opinion of The International Searching Authority, or The Declaration for Application PCT/DK2020/050128 dated Aug. 11, 2020.

* cited by examiner

| Unit | Ptar | prl | Pset |
|---|---|---|---|
| 0 | 2000 | 2 | 2000 |
| 1 | 3000 | 1 | 3000 |
| 2 | 2000 | 3 | 1500 |
| 3 | - | - | 500 |

Tab. 1

| Unit | Ptar | prl | Pset |
|---|---|---|---|
| 0 | 3000 | 1 | 2500 |
| 1 | 2000 | 1 | 1500 |
| 2 | 2000 | 3 | 500 |
| 3 | - | - | 500 |

Tab. 2

| Unit | Ptar | prl | Pset |
|---|---|---|---|
| 0 | 1500 | 2 | 1500 |
| 1 | 1000 | 1 | 1000 |
| 2 | 2000 | 3 | 2500 |
| 3 | - | - | 3000 |

Tab. 3

| Unit | Ptar | prl | Pset |
|---|---|---|---|
| 0 | 2500 | 2 | 2000 |
| 1 | 3000 | 1 | 3000 |
| 2 | 2000 | 3 | PAUSE |
| 3 | - | - | PAUSE |

Tab. 4

Fig. 4

PRIORITIZATION OF POWER SET-POINTS FOR POWER GENERATING UNITS IN A POWER PLANT

FIELD OF THE INVENTION

The invention relates to control of power plants, particularly power plants which has one or more wind turbines and to determination and dispatching of power set-points to the power generating units of the power plant.

BACKGROUND OF THE INVENTION

The power set-points for wind turbines in a power plant may be determined according to rules which are based on individual power production and available power levels of the wind turbines.

Such rules may be advantageous for achieving an optimum distribution of power set-points with respect to minimizing production costs, minimizing wind turbine loads and other criteria. However, in some situations it may be desired to deviate from these rules in order to meet more specific power production needs.

Accordingly, it is a problem that present power dispatching methods are not suited to meet more specific power production needs and, therefore, improved power dispatching methods are needed.

EP 3 149 325 A1 discloses a method for controlling a wind power plant comprising a plurality of wind turbine generators. The method includes determining a required amount of reactive power provided by the plurality of wind turbine generators, and grouping the plurality of wind turbine generators into a first set of wind turbine generators and a second set of wind turbine generators based on a demand for reactive power, and supplying reactive power to the grid from the first set of wind turbine generators and disconnecting the second set of wind turbine generators from the electrical grid in response to a control demand in order to minimize active power losses.

SUMMARY

It is an object of the invention to improve control of power plants to alleviate one or more of the above mentioned problems, and therefore to provide a method which provides improved flexibility of power dispatching methods.

In a first aspect of the invention, a method for controlling power generation from a power plant which comprises a plurality of power generating units including at least one wind turbine generator is presented. The power generation system is connected to an electrical power grid for supplying power from the power generating units to the electrical power grid, and the power generating units are controllable to produce power dependent on individual power set-points, the method comprises:
  obtaining desired target power set-points for one or more prioritized power generating units,
  determining final target power set-points for the one or more prioritized power generating units based on the target power set-points and an available power adjustment margin of the power plant which is available for adjustment of the power set-points of the one or more prioritized power generating units,
  dispatching the final target power set-points to the prioritized power generating units.

The target power set-points may be provided for specific power generating units. Alternatively, the target power set-points may be provided without an association to specific power generating units, where the association is determined based on certain criteria, e.g. criteria which determines which power generating unit would be advantageous for fulfilling the desired target power set-point. A combination of these are also possible, i.e. where one or more target power set-points are provided for specific power generating units, and where the remaining target power set-points are not initially associated with specific power generating units.

Whether or not the target power set-points are associated initially with specific power generating units such as specific wind turbines, the target power set-points advantageously provides an option to allow specific or groups of power generating units to produce at a desired power level without affecting the total production from the power plant, Thus, individual power set-points may be targeted without affecting the plant level production and potentially breeching power plant requirements such as grid frequency control or grid operator commands.

For example, it may be desirable to have old or problematic units preferred for lower production in order to minimize wear, A power generating unit may be preferred for higher power production, e.g. in case that this unit is undergoing a test which requires maximum production.

In another example, in a park where different power generating units have different owners, individual owners would have some control over the power production of their power generating units by setting desired target power set-points without affecting the power plant's total production.

The available power adjustment margin of the power plant is the compensation power which is available from power generating units of which no final target power set-point have been assigned. Thus, the available power adjustment margin is determined based on how much the power production can be increased or decreased for the available compensation units subject to the required total power production of the power plant.

According to an embodiment, the method further comprises obtaining priority levels associated with the desired target power set-points. Advantageously, the priority levels enables differentiated prioritizing of the power set-points.

According to an embodiment, the determining of the final target power set-points is determined sequentially in descending order of the prioritization levels.

According to an embodiment, if the desired target power set-point for a given prioritization cannot be fully achieved, the method comprises determining adjusted power set-points for the lower prioritized and/or non-prioritized power generating units based on the determined final target power set-points and a power plant reference.

According to an embodiment, the adjusted power set-points are determined based on a distribution of a remaining power production up to the power plant reference among the lower prioritized and/or non-prioritized power generating units.

As an alternative to distributing the remaining power production among the lower prioritized and/or non-prioritized power generating units, the highest prioritized power generating units among the lower prioritized power generating units could have their power set-points determined (even though their original target set-points cannot be fulfilled) from a remaining available power adjustment margin of the power plant, i.e. which may be determined from the still lower prioritized and/or non-prioritized power generating units.

According to an embodiment, the method comprises
obtaining minimum and maximum power limits defining minimum and maximum power production capabilities of the power generating units, and
determining the available power adjustment margin subject to constraints defined by the minimum and maximum power limits and a power plant reference.

The total power production of the power plant as set by the power plant reference should normally be fulfilled. Power generating units such as wind turbines may have a minimum power production which has to be respected and a maximum power production, e.g. the nominal power production or other maximum power production values.

According to an embodiment, the method comprises determining the available power adjustment margins based on comparing present power set-points of the one or more lower prioritized and/or non-prioritized power generating units with the associated minimum or maximum power limits.

For example, the power adjustment margin—in case the target power set-points need to be maximized—may be determined as the difference of the sum of present power set-points and the sum of the minimum power limits of the lower prioritized and/or non-prioritized power generating units. Similarly, the power adjustment margin—in case the target power set-points need to be minimized—may be determined as the difference of the sum of the maximum power limits and sum of present power set-points and of the lower prioritized and/or non-prioritized power generating units.

According to an embodiment, the method comprises determining the final target power set-points for the one or more prioritized power generating units subject to a constraint of a power plant reference.

According to an embodiment, determining of the final target power set-points for the prioritized power generating units comprises setting the final target power set-points equal to the desired target set-points, or if the desired target set-points cannot be achieved, determining the final target power set-points by distributing the available power adjustment margin among the prioritized power generating units.

According to an embodiment, the method comprises assigning a pause priority status to the priority level of the one or more prioritized power generating units so that non-prioritized power generating units or power generating units with priority levels below the priority level assigned with the pause priority status can be set to a pause mode which sets the minimum power limits to zero or substantially zero.

Advantageously, by setting one or more power generating units to a pause status releases more compensation power capacity to enable prioritized power generating units to produce maximum power.

A second aspect of the invention relates to a central controller for controlling power production of a power plant which comprises a plurality of power generating units including at least one wind turbine generator, where the power plant is connected to an electrical power grid for supplying power from the power generating units to the electrical power grid, and where at the central controller is arranged to dispatch individual power set-points to the power generating units, and where the central controller is arranged to perform the method according to the first aspect.

A third aspect of the invention relates to a power plant which comprises a plurality of power generating units including at least one wind turbine generator and the central controller according to the second aspect.

A fourth aspect of the invention relates to a computer program product comprising software code adapted to control a power plant when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 4 shows calculation examples for determining the power set-points.

DESCRIPTION OF EMBODIMENTS

Figure 1:
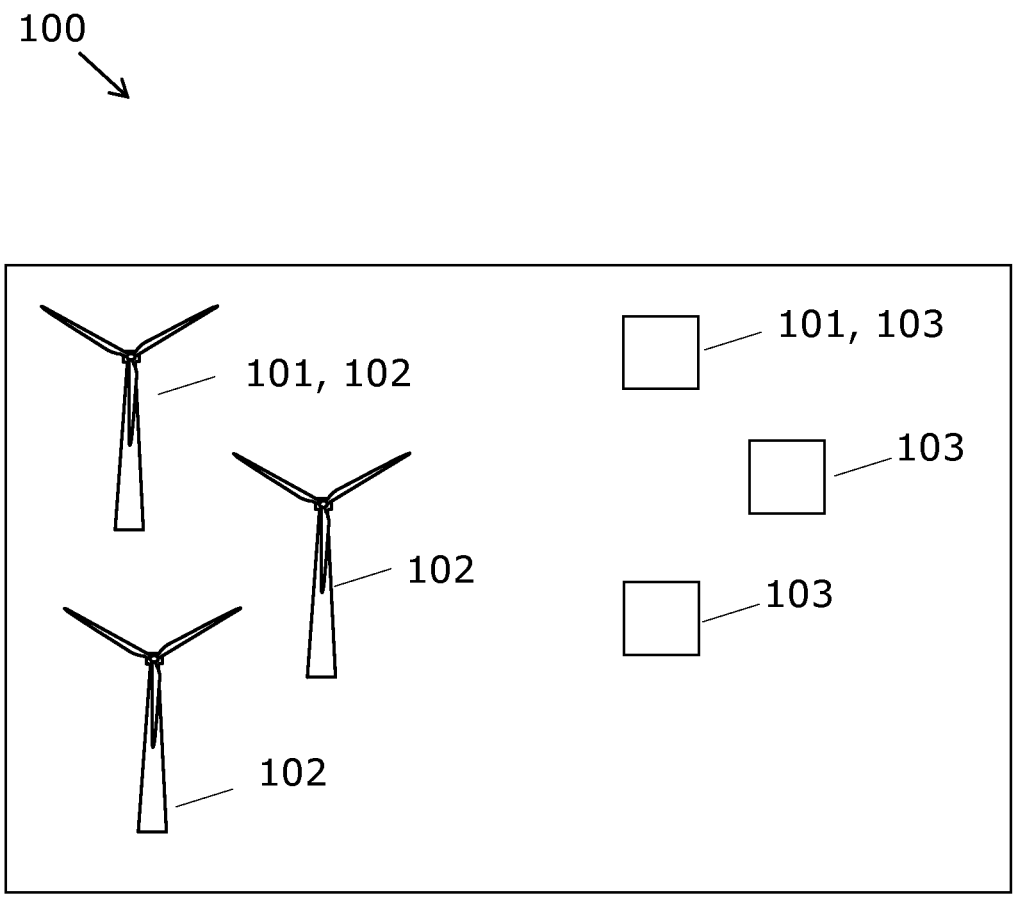
FIG. 1 shows a power plant including a plurality of power generating units and wind turbines.
Figure 1:
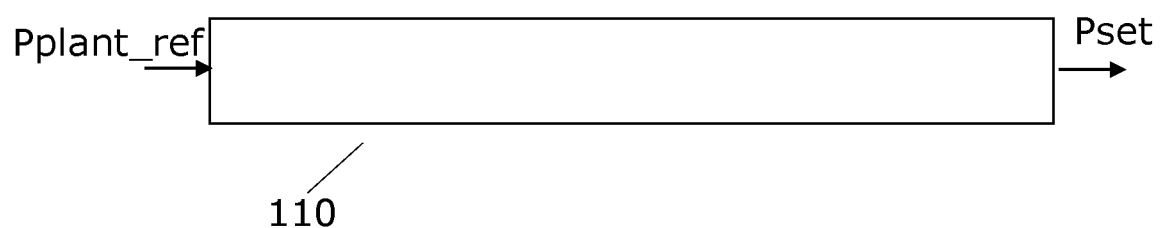

FIG. 1 shows a power plant 100 which comprises a plurality of power generating units 101 such as wind turbines. The power plant 100 may be a renewable power plant comprising only renewable power generating units. In general, the power generating units 101 may consist of different types of power generating units, e.g. different types of renewable power generating units such as solar power units 103 (e.g. photovoltaic solar panels) and wind turbines. The different types of power generating units 101 may also include fossil based power production units, e.g. diesel engines. According to an embodiment, at least one of the power producing units 101 of the power plant 100 is a wind turbine. The power plant 100 may comprise at least three power generating units 101 of the same or different types, i.e. a mix, of different types of power generating units. For example, the power plant 100 may consist only of wind turbines 102 and in this case at least three wind turbines 102. In another example, the power plant 100 comprises at least two wind turbines 102 and at least one or two other power generating units 101.

The power plant is connectable with an electrical power grid (not shown) for supplying power from the power generating units 101 to the electrical power grid.

The power plant 100 is controlled by a central controller 110. The central controller 110 is arranged to control power generation from the power generating units 101 according to a power plant reference Pplant_ref which defines the desired power to be supplied to the grid from the power plant 100. Furthermore, the central controller is arranged to dispatch power set-points Pset to the power generating units, i.e. individual power set-points to each power generating unit 101 which sets the desired power productions. The power set-points Pset may be determined by the central controller 110 dependent on the power plant reference Pplant_ref so that the sum of power set-points Pset corresponds to the power plant reference Pplant_ref.

Throughout this description, power reference is used for the demanded power for the wind power plant, whereas power set-point is used for the demanded power for the individual power generating units.

Thus, an objective of the central controller 110 or a dispatcher comprised by the central controller is to ensure that the demanded power (e.g. from the Transmission System Operator (TSO)) is delivered as fast as possible, this applies both to increases and decreases in the power plant reference, Pplant_ref.

The wind turbine 101 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exists for other power generating units 101.

Herein any reference to power such as power plant reference Pplant_ref, power set points Pset, available power Pav and produced power Pprod can define active, reactive or apparent power levels. According to an embodiment, the power levels, such as Plant_ref, Pset, Pav, Pprod and other related power levels are active power levels.

The available power Pav of a wind turbine 102 can be determined based on the current wind speed and other parameters limiting the power production. Herein, the available power Pav is defined as the maximum possible power output of a wind turbine under the given wind conditions. Thus, the available power will be close to the power output according to the power optimised power curve of a specific turbine. The power curve used herein is understood as the power Coefficient (Cp) optimised power curve for the specific turbine. In other words, the power curve represents the maximum power output of a turbine under normal operation as a function of the wind speed.

Figure 2:
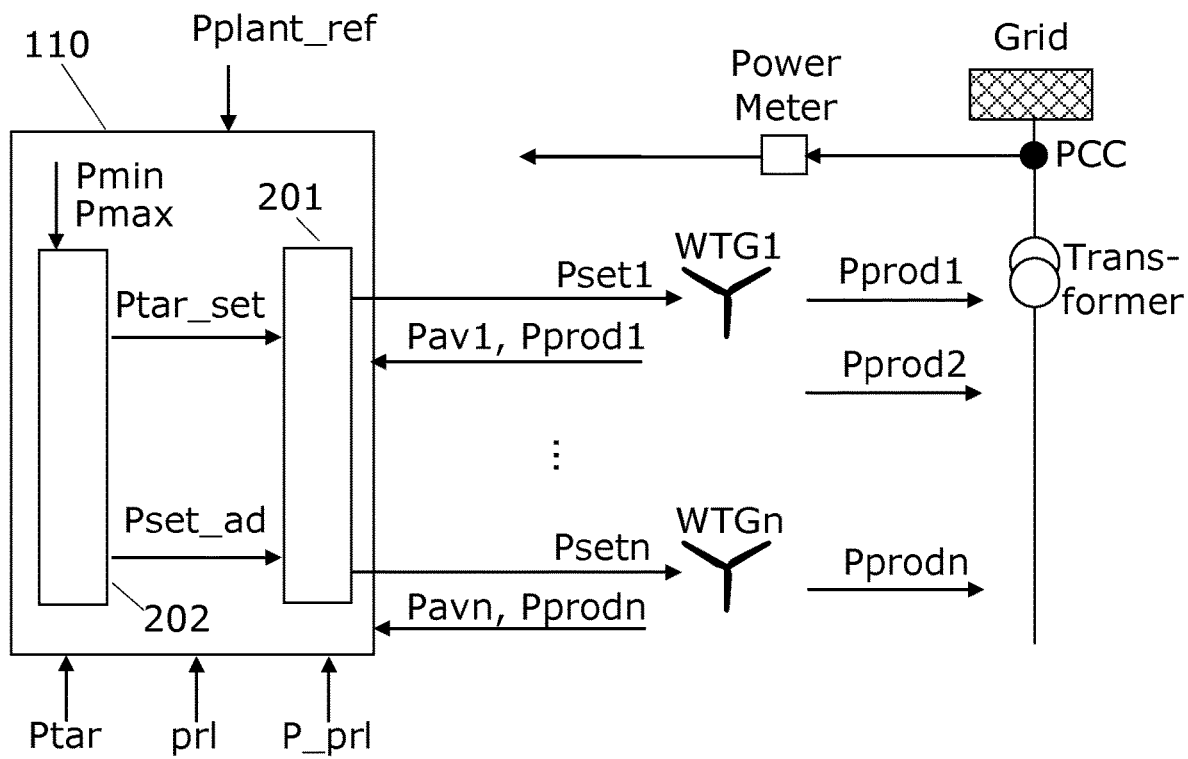
FIG. 2 shows an example of the central controller of the power plant.

FIG. 2 exemplifies the arrangement of the dispatcher 201. In this example, the power generating units 101 are wind turbine generators 102, but the power generating units could also comprise a mix of wind turbine generators and other types of power generating units. Therefore, in order to keep the description general, reference is made to power generating units 101 unless the specific contest refers to a wind turbine example.

It can be seen that the dispatcher 201 is disclosed as being part of a central controller 110. The dispatcher receives the power plant reference Pplant_ref and determines the power set points Pset, e.g. power set points Pset1, Pset2, . . . , Psetn for the respective wind turbine generators WTG1, WTG2, . . . , WTGn, based on a plurality of status feedback signals. The feedback signals comprise the available power of the individual power generating units Pav1 . . . Pavn and the produced power of individual power generating units Pprod1 . . . Prodn.

The power set points Pset may further be determined according to target power set-points Ptar which are received by the central controller 110. The target power set-points Ptar are associated with specific prioritized power generating units 101 and sets a desired power. The target power set-points Ptar may be set or provided by owners of the wind turbines, a grid operator, service people or other. The target power set-points may be set for one or more power generating units 101. The one or more power generating units 101 which has an associated target power set-point are defined as prioritized power generating units.

The prioritized power generating units 101 may be provided with different prioritization levels prl so that the target power set-points Ptar of the highest prioritized power generating units 101 are prioritized over the lower prioritized power generating units 101.

The priority levels prl are assigned to a target power set-point of a specific wind turbine. Accordingly, a priority level prl is associated both with a specific power generating unit 101 and a specific target power set-point.

Pav1 is the power available from a wind turbine 102 at the given time, calculated based on the current wind speed and other parameters limiting the power production. Thus, the available power of the power system is therefore the aggregation of the individual available powers. Pprod1 is the power produced by a specific wind turbine 102 at the given time.

In case the power plant reference Pplant_ref is increased, the determination of the individual power set points Pset is determined based on available power of the individual power generating units Pav1, . . . , Pavn. In case the power plant reference Pplant_ref is decreased, the determination of the individual power set Pset is determined based on and the produced power of individual power generating units Pprod1 . . . Prodn.

The actual power production Pprod1, . . . , Prodn of the power generating units 101 is fed to a feeder line, which is connected to a Point of common coupling (PCC) via a transformer. At the PCC the aggregated power production is measured by means of a power meter. The measured power (P measurement) is communicated to the PPC.

In addition to the target power set-points Ptar, priority levels prl associated with the target power set-points Ptar, and consequently with the specific power generating units 101, may be set.

As noted above, the determination of the power set-points Pset may further be based on the target power set-points Ptar. The target set-points Ptar, such as Ptar1 . . . Ptarn, may be set for specific power generating units 101 such as specific ones of the wind turbines WTG1, . . . , WTGn. When priority levels prl are provided, the power set-points Pset are determined dependent on both the target power set-points Ptar and the associated priority levels prl.

Since the target power set-points Ptar for a given prioritization level prl may be not be fully achievable, e.g. Ptar may be too high or too low, the determination of the power set-points Pset based on the target power set-points Ptar may involve an intermediate determination of one or more final target power set-points Ptar_set for the one or more prioritized power generating units 101.

The final target power set-point Ptar_set for a given power generating unit 101 is determined based on the target power set-point Ptar and available power adjustment margins of other power generating units which are available for achieving the target power set-point, i.e. which are available for adjustment of the power set-points Pset of prioritized or higher prioritized power generating units 101. A sum of the available power adjustment margins gives an available power adjustment margin Pcomp of the power plant which is available for adjustment of the power set-points.

The available power adjustment margin Pcomp gives a compensation power which is available for achieving the desired target power set-points.

The power production of each power generating unit may be constrained according to minimum and maximum power limits Pmin, Pmax. For a wind turbine 102, the minimum power limit Pmin may be given from the power production specification, i.e. the minimum power limit is defined by the minimum power production capability, or other defined minimum power limits such as user defined power limits. The maximum power limit Pmax for a wind turbine 102 may be given by the nominal power specification, i.e. the maximal power capability, by the available power Pav or other user defined maximal power limits.

As indicated in FIG. 2, the minimum and maximum power limits Pmin, Pmax may be determined by the central controller 110, or other processing unit, and used by the power set-point processing unit 202 for determining the final target power set-points Ptar_set.

Thus, the available power adjustment margins—which are equivalent to the possible minimum and maximum variations ΔPmin, ΔPmax of the power set-points of the power generating units 101—may be determined based on the present power set-points Pset and the minimum and maximum power limits Pmin, Pmax. The final target power set-points Ptar_set may be determined based on the available power adjustment margins or, equivalently, based on the minimum and maximum power limits Pmin, Pmax with use of the present power set-points Pset.

In other words, the available power adjustment margins may be determined by comparing the present power set-points Pset of the one or more lower prioritized and/or non-prioritized power generating units with the associated minimum or maximum power limits Pmin, Pmax.

The sum of the available positive power adjustment margins (i.e. power increases) gives the total available positive adjustment power Pcomp of the power plant. Similarly, the sum of the available negative power adjustment margins (i.e. power reductions) gives the total available negative adjustment power Pcomp of the power plant. Thus, in general, the sum of the available positive power adjustment margins, in the form of available power increases or available power decreases gives the total available positive adjustment power Pcomp of the power plant.

For example, the power adjustment margin Pcomp in case the target power set-points Ptar need to be maximized may be determined as Pcomp=SUM(Pset)−SUM(Pmin) and, similarly, the power adjustment margin Pcomp in case the target power set-points Ptar need to be minimized may be determined as Pcomp=SUM(Pmax)−SUM(Pset), where the sum is over the relevant power generating units 101.

Thus, whether the total available positive adjustment power Pcomp is determined from available power increases or available power decreases of the remaining power generating units depends on whether the target power set-points Ptar should be increased or decreased in order to meet the desired power targets.

Figure 3:
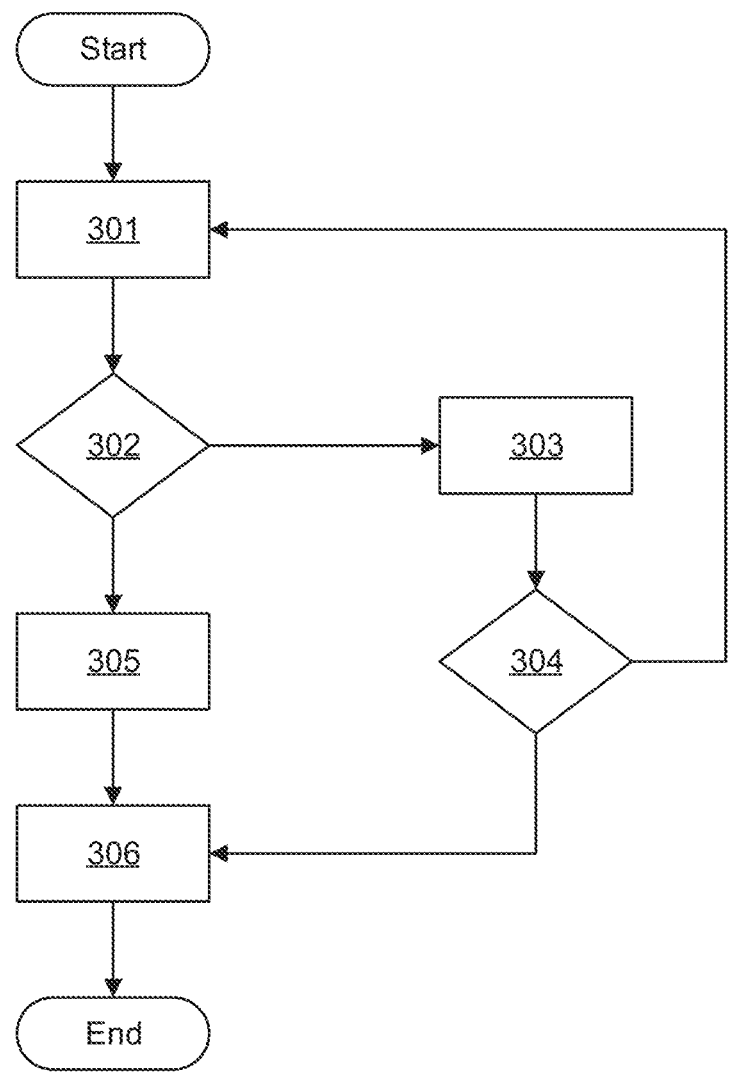
FIG. 3 shows steps of determining the power set-points dependent on priority levels.

FIG. 3 shows an example of how the priority levels prl can be used in connection with determining the final target power set-points Ptar_set. In step 301, initially the one or more target power set-points Ptar with the highest associated priority levels prl are obtained.

In step 302 it is checked if the target power set-points Ptar are achievable with respect to the minimum and maximum power limits Pmin, Pmax of the power generating units 101 associated with the actual priority level prl. In step 302 it is further checked if the rest of the power generating units, i.e. the lower prioritized or non-prioritized power generating units, can compensate with adjustments of their power set-points so that the power set-points of units 101 with the actual priority level can be fully or partially adjusted to the target power set-points Ptar.

Full compensation is possible if the available power adjustment margins of one or more lower prioritized and/or non-prioritized power generating units which are available for adjustment of the power set-points are sufficient to achieve the target power set-points Ptar. Partial compensation is chosen, if the available power adjustment margin Pcomp only allows partial fulfillment of the target power set-points Ptar.

In step 303, if full compensation is possible, the final target power set-points Ptar_set of the power generating units 101 associated with the actual priority level prl are set to the target power set-points Ptar. Equivalently, the power set-points Pset of the power generating units 101 associated with the actual priority level prl are set to the target power set-points Ptar, or equivalently, the target power set-points Ptar are dispatched to the power generating units 101 associated with the actual priority level prl.

Step 302 may be performed by the power set-point processing unit 202. Step 303 which comprises setting the power set-points Pset to the final target power set-points Pset_tar may be performed by the dispatcher 201.

In step 305, if full compensation is not possible, the final target power set-points Ptar_set of the power generating units 101 associated with the actual priority level prl are set dependent on the available power adjustment margin Pcomp, e.g. by distributing the sum of available power adjustment margins among the power generating units 101 with the actual priority level. Thus, the amount of power that can be compensated for by the lower prioritized or non-prioritized power generating units is distributed, e.g. evenly, among the power generating units with the higher priority level.

Step 305 which comprises determining the power set-points Pset according to the available compensation power Pcomp may be performed by the dispatcher 201.

If step 303 is performed, then in step 304, it is checked if there are unprocessed lower priority levels prl. If this is the case, the process continues with step 301, wherein the one or more target power set-points Ptar with the next highest associated priority levels prl are obtained. These target power set-points are then processed in the same way as the previously processed target power set-points Ptar.

In step 304, if there or no further unprocessed lower priority levels, or if partial compensation has been performed in step 305, then normal dispatching is performed for the remaining lower prioritized and/or non-prioritized power generating units based on the previously determined final target power set-points Ptar_set and a power plant reference Pplant_ref. That is, adjusted power set-points Pset are determined for the remaining power generating units so that the sum of power set-points Pset dispatched to the plurality of power generating units satisfies the power plant reference Pplant_ref, i.e. the power plant reference Pplant_ref set a constraint on the power which should be produced by the power plant 100.

Thus, the adjusted power set-points Pset may be determined based on the final target power set-points Ptar_set determined for the higher prioritized power generating units and the power plant reference Pplant_ref. For example, the adjusted power set-points Pset may be determined based on determining a distribution of the remaining power production up to the power plant reference Pplant_ref among the lower prioritized and/or non-prioritized power generating units. The distribution may be performed according to a dispatching scheme used by the power plant 100 in situations where no target power set-points are given.

By processing the target power set-points Pset dependent on their associated priority levels prl, the final target power set-points Ptar_set will be determined sequentially in descending order of the prioritization levels.

As explained above, the final target power set-points Ptar_set are dispatched to the prioritized power generating units, or equivalently power set-points Pset determined from the desired target power set-points Pset or from the determined final target power set-points Ptar_set are dispatched to the prioritized power generating units.

As indicated in FIG. 2, a pause priority status P_prl may be provided to the central controller 110. The pause priority status P_prl is a command which includes a given priority level prl. Non-prioritized power generating units or power generating units with priority levels below the priority level of the pause priority status P_prl has the option to be set to a pause mode if higher prioritized power generating units can only achieve the target power, fully or partially, with the added power adjustment margin Pcomp of the paused power generating units 101, That is, the pause priority status P_prl sets the minimum power limit Pmin of a given power generating unit, e.g. a wind turbine 102, to zero or substantially zero. Thus, the pause status of one or more power generating units 100 releases additional power that can be used by the power generating units having a priority level at or above the priority level of the pause priority status P_prl. The pause priority status P_prl may be set automatically (if any pause priority status is set) by the central controller 110 if the target power set-points Ptar can not be achieved based on the power adjustment margin Pcomp of non-paused units 101, FIG. 4 shows an example of a power plant 100 with four power generating 101 units 0-3, in this example wind turbines. For simplicity, the maximum power Pmax is set to 3000 kW and the minimum power is set to 500 kW.

In the example in Tab. 1, the power plant reference Pplant_ref is 7000 kW. Target power set-points Ptar of 3000 kW and 2000 kW, and priority levels prl of 2 and 1, have been set for power generating units 0 and 1, respectively. The sum of available power adjustment margins Pcomp of units 2 and 3 is at least 7000 kW−2*500 kW=6000 kW, implying that the target power set-points Ptar of units 0 and 1 can be fulfilled.

Unit 2 has Ptar=2000 kW. Since unit 3 cannot produce less than 500 kW, Ptar of unit 2 can only be partially achieved with Ptar_set=Pset=1500 kW. Accordingly, Pset for unit 3 is set to 500 kW.

In the example in Tab. 2, the power plant reference Pplant_ref is 5000 kW, Target power set-points Ptar of 3000 kW and 2000 kW, and equal priority levels prl of 1, have been set for power generating units 0 and 1, respectively. The sum of available power adjustment margins Pcomp of units 2 and 3 is at least 5000 kW−2*500 kW=4000 kW, implying that the target power set-points Ptar of units 0 and 1 can only be partially fulfilled. Equal distribution of a reduction of their targets Ptar, subject to the available 4000 kW, gives power set-points of 2500 and 1500, respectively for units 0 and 1. Since no power adjustment margin Pcomp is available for units 2 and 3, their power set-points are set to 500 kW.

In the example in Tab. 3, the power plant reference Pplant_ref is 8000 kW. Target power set-points Ptar of 1500 kW and 1000 kW, and priority levels prl of 2 and 1, have been set for power generating units 0 and 1, respectively. The sum of available power adjustment margins Pcomp of units 2 and 3 (in this case a low production for units 0 and 1 is desired) implies that the production sum of units 0 and 1 can be reduced to 8000 kW−2*3000 kW=2000 kW, implying that the target power set-points Ptar of units 0 and 1 can be fulfilled.

Unit 2 has Ptar=2000 kW. Since unit 3 cannot produce more than 3000 kW, Ptar of unit 2 can only be partially achieved with Ptar_set=Pset=2500 kW. Accordingly, Pset for unit 3 is set to 3000 kW.

In the example in Tab. 3, the power plant reference Pplant_ref is 5000 kW and a pause priority P_prl=2 is set. In this case, the target power set-point Ptar of unit 1, with prl=1, can be fulfilled. Unit 0 cannot meet its target, but due to the pause priority, units with priority levels below 2 can be pause to help unit 0 to get as close as possible to its target power set-point Ptar=2500. Due to Pplant=5000 kW, Ptar_set=Pset is 2000 kW for unit 0. Without the pause priority, units 2 and 3 would each end up with Pset=500 kW, implying that unit 0 would only be given Pset=1000 kW.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of controlling power generation from a power plant which comprises a plurality of power generating units including at least one wind turbine generator, where the power plant is connected to an electrical power grid for supplying power from the power generating units to the electrical power grid, and where the power generating units are controllable to produce power dependent on individual power set-points, the method comprising:
   obtaining desired target power set-points for one or more prioritized power generating units, wherein the desired target power set-points set a desired power on specific ones of the one or more prioritized power generating units;
   determining final target power set-points for the one or more prioritized power generating units based on the desired target power set-points and an available power adjustment margin of the power plant which is available for adjustment of the desired target power set-points of the one or more prioritized power generating units, wherein determining the final target power set-points for the one or more prioritized power generating units is subject to a constraint of a power plant reference; and
   dispatching the final target power set-points to the prioritized power generating units.

2. The method of claim 1, further comprising obtaining priority levels associated with the desired target power set-points.

3. The method of claim 2, wherein the determining of the final target power set-points is determined sequentially in descending order of the prioritization levels.

4. The method of claim 3, wherein in response to the desired target power set-point for a given prioritization not being fully achievable, the method comprises determining adjusted power set-points for lower prioritized and/or non-prioritized power generating units based on the determined final target power set-points and the power plant reference.

5. The method of claim 4, wherein the adjusted power set-points are determined based on a distribution of a remaining power production up to the power plant reference among the lower prioritized and/or non-prioritized power generating units.

6. The method of claim 1, comprising:
obtaining minimum and maximum power limits defining minimum and maximum power production capabilities of the power generating units; and
determining the available power adjustment margin subject to constraints defined by the minimum and maximum power limits and the power plant reference.

7. The method of claim 6, further comprising determining the available power adjustment margins based on comparing present power set-points of one or more lower prioritized and/or non-prioritized power generating units with the associated minimum or maximum power limits.

8. The method of claim 1, wherein the determining of the final target power set-points for the prioritized power generating units comprises setting the final target power set-points equal to the desired target power set-points, or in response to the desired target power set-points not being achievable determining the final target power set-points by distributing the available power adjustment margin among the prioritized power generating units.

9. The method of claim 6, further comprising:
assigning a pause priority status to a priority level of the one or more prioritized power generating units so that non-prioritized power generating units or power generating units with priority levels below the priority level assigned with the pause priority status can be set to a pause mode which sets the minimum power limits to zero.

10. A central controller for controlling power production of a power plant which comprises a plurality of power generating units including at least one wind turbine generator, where the power plant is connected to an electrical power grid for supplying power from the power generating units to the electrical power grid, and where the central controller is arranged to dispatch individual power set-points to the power generating units, and where the central controller is configured to perform an operation, comprising:
obtaining desired target power set-points for one or more prioritized power generating units, wherein the desired target power set-points set a desired power on specific ones of the one or more prioritized power generating units;
determining final target power set-points for the one or more prioritized power generating units based on the desired target power set-points and an available power adjustment margin of the power plant which is available for adjustment of the desired target power set-points of the one or more prioritized power generating units, wherein determining the final target power set-points for the one or more prioritized power generating units is subject to a constraint of a power plant reference; and
dispatching the final target power set-points to the prioritized power generating units.

11. A power plant, comprising:
a plurality of power generating units including at least one wind turbine generator, where the plurality of power generating units supply power to a connected electrical power grid; and
a central controller for controlling power production of the power plant, where the central controller is arranged to dispatch individual power set-points to the power generating units, and where the central controller is configured to perform an operation, comprising:
obtaining a desired target power set-point for each of one or more prioritized power generating units, wherein the desired target power set-points set a desired power on specific ones of the one or more prioritized power generating units;
determining final target power set-points for the one or more prioritized power generating units based on the desired target power set-points and an available power adjustment margin of the power plant which is available for adjustment of the desired target power set-points of the one or more prioritized power generating units, wherein determining the final target power set-points for the one or more prioritized power generating units is subject to a constraint of a power plant reference; and
dispatching the final target power set-points to the prioritized power generating units.

12. The power plant of claim 11, further comprising obtaining priority levels associated with the desired target power set-points.

13. The power plant of claim 12, wherein the determining of the final target power set-points is determined sequentially in descending order of the prioritization levels.

14. The power plant of claim 13, wherein in response to the desired target power set-point for a given prioritization not being fully achievable, the operation comprises determining adjusted power set-points for lower prioritized and/or non-prioritized power generating units based on the determined final target power set-points and a power plant reference.

15. A computer program product comprising software code adapted to control a power plant when executed on a data processing system, the computer program product being adapted to perform an operation for controlling power production of a power plant having a plurality of power generating units including at least one wind turbine generator, where the plurality of power generating units supply power to a connected electrical power grid; the operation, comprising:
obtaining a respective, desired target power set-point for each of one or more prioritized power generating units, wherein the desired target power set-points set a desired power on pre-selected ones of the one or more prioritized power generating units;
determining final target power set-points for the one or more prioritized power generating units based on the desired target power set-points and an available power adjustment margin of the power plant which is available for adjustment of the desired target power set-points of the one or more prioritized power generating units, wherein determining the final target power set-points for the one or more prioritized power generating units is subject to a constraint of a power plant reference; and dispatching the final target power set-points to the prioritized power generating units.

16. The computer program product of claim 15, wherein the operation further comprises obtaining priority levels associated with the desired target power set-points.

17. The computer program product of claim 16, wherein the operation further comprises determining of the final target power set-points is determined sequentially in descending order of the prioritization levels.

18. The computer program product of claim 17, wherein in response to the desired target power set-point for a given prioritization not being fully achievable, the operation comprises determining adjusted power set-points for lower prioritized and/or non-prioritized power generating units based on the determined final target power set-points and a power plant reference.

* * * * *